(12) United States Patent
Laughlin

(10) Patent No.: US 9,411,107 B2
(45) Date of Patent: Aug. 9, 2016

(54) N X M MONOLITHIC SWITCH FOR AN OPTICAL NETWORK AND METHOD OF OPERATION THEREOF

(75) Inventor: Richard H. Laughlin, Tyler, TX (US)

(73) Assignee: Greg S. Laughlin, Cedar Park, TX (US)

( * ) Notice: Subject to any disclaimer, the term of this patent is extended or adjusted under 35 U.S.C. 154(b) by 105 days.

(21) Appl. No.: 13/024,651

(22) Filed: Feb. 10, 2011

(65) Prior Publication Data

US 2012/0207429 A1 Aug. 16, 2012

(51) Int. Cl.
*G02B 6/26* (2006.01)
*G02B 6/35* (2006.01)
(52) U.S. Cl.
CPC ............ *G02B 6/3544* (2013.01); *G02B 6/3536* (2013.01)
(58) Field of Classification Search
CPC .. G02B 6/3544; G02B 6/3536; G02B 6/3546; G02B 6/43; G02B 6/32; G02B 6/262; H04Q 2011/0058
USPC .............................................. 385/16–18, 147
See application file for complete search history.

(56) References Cited

U.S. PATENT DOCUMENTS

| | | | |
|---|---|---|---|
| 5,444,801 A | 8/1995 | Laughlin | |
| 5,911,018 A * | 6/1999 | Bischel et al. | 385/16 |
| 6,028,978 A * | 2/2000 | Takeuchi et al. | 385/147 |
| 6,058,228 A * | 5/2000 | Fasanella et al. | 385/17 |
| 6,236,778 B1 | 5/2001 | Laughlin | |
| 6,650,822 B1 * | 11/2003 | Zhou | 385/147 |
| 7,003,187 B2 * | 2/2006 | Frick et al. | 385/16 |
| RE40,489 E * | 9/2008 | Takeuchi et al. | 345/63 |

* cited by examiner

*Primary Examiner* — Ellen Kim

(57) ABSTRACT

An N×M monolithic switch and a method of operating the switch. In one embodiment, the switch includes: (1) a monolithic refractive element, (2) N input/output ports coupled to the monolithic refractive element and configured to inject electromagnetic energy into a first set of planes in the monolithic refractive element at an angle that causes total internal reflection of the electromagnetic energy between first and second refractive surfaces of the monolithic refractive element, N being greater than one, (3) M input/output ports coupled to the monolithic refractive element and configured to extract electromagnetic energy travelling in a second set of planes in the monolithic refractive element, M being greater than one, the second set of planes being aparallel to the first set of planes and (4) a plurality of frustrating elements coupled to the monolithic refractive element and corresponding to the N input/output ports and the M input/output ports and configured to frustrate the total internal reflection selectively to cause the electromagnetic energy to travel from ones of the first set of planes to ones of the second set of planes.

20 Claims, 6 Drawing Sheets

N X M MONOLITHIC SWITCH FOR AN OPTICAL NETWORK AND METHOD OF OPERATION THEREOF

TECHNICAL FIELD

This application is directed, in general, to optical cross-connects and, more specifically, to an N×M switch.

BACKGROUND

Frustrated total internal reflection (FTIR), where a second refractive material is introduced into a beam to change the direction of that beam, is a known technique for carrying out optical switching.

For example, U.S. Pat. No. 5,444,801, issued to Laughlin on Aug. 22, 1995, entitled "Apparatus for Switching Optical Signals and Method of Operation" is directed to an FTIR switch having a first switch plate that encodes a collimated beam in a shallow angle in first plane that is projected onto a second orthogonal switch plate that encodes a second orthogonal shallow angle on the collimated beam and is projected through a single lens onto a focal plane to a plurality of fibers. Unfortunately, this FTIR switch is limited by the number of fibers that can be placed at the focal plane of the lens with an acceptable lens blur (and concomitant coupling loss) and the ability to precisely position each fiber to a submicron level at the focal plane. For this reason, this FTIR switch is limited to 1×N switching and to the number of fibers that can be accommodated at the focal plane. Thus this FTIR switch requires that the number of switch plates equal $\log_2$ (N outputs).

Another example is U.S. Pat. No. 6,236,778, also issued to Laughlin on Aug. 22, 1995, entitled "Apparatus for Switching Optical Signals and Method of Operation" and directed to an N×M FTIR switch matrix (N and M each representing a bus). The input bus has N inputs, and the output bus has M inputs. The FTIR switch matrix requires that the input bus and output bus be orthogonal to each other and in contact at interface nodes thereof. Both the input bus and the output bus are individual refractive elements. An input beam is reflected at input nodes down the input bus and switched at one of the interface nodes, by both the input bus and the output bus, and then reflected down the output bus at reflection nodes thereof. Unfortunately, the FTIR switch matrix requires M plus N individual buses (refractive elements) and two frustrating elements for every interface node. Consequently, the FTIR switch matrix requires not only that first and second frustrating elements be precisely aligned, but also that each of the M plus N buses must be precisely aligned with each other and in intimate contact (within a few angstroms) of each other.

With a growing emphasis on fiber networks, there is a growing requirement to employ N×M switching in those networks. One method commonly used today to facilitate an N×M switch is to use two arrays of 1×N switches. N inputs and M outputs require (M+N) 1×N switches. For example, eight 1×4 switches are required to implement a 4×4 switch. The eight 1×4 switches have a total of 5×8=40 input/output ports and 8×4=32 switch elements and corresponding drivers. Each of these input/output ports and switch elements and corresponding drivers are expensive both in terms of material and labor to fabricate, assemble and align precisely.

SUMMARY

One aspect provides an N×M monolithic switch. In one embodiment, the switch includes: (1) a monolithic refractive element, (2) N input/output ports coupled to the monolithic refractive element and configured to inject electromagnetic energy into a first set of planes in the monolithic refractive element at an angle that causes total internal reflection of the electromagnetic energy between first and second refractive surfaces of the monolithic refractive element, N being greater than one, (3) M input/output ports coupled to the monolithic refractive element and configured to extract electromagnetic energy travelling in a second set of planes in the monolithic refractive element, M being greater than one, the second set of planes being aparallel to the first set of planes and (4) a plurality of frustrating elements coupled to the monolithic refractive element and corresponding to the N input/output ports and the M input/output ports and configured to frustrate the total internal reflection selectively to cause the electromagnetic energy to travel from ones of the first set of planes to ones of the second set of planes.

In another embodiment, the switch includes: (1) a monolithic refractive element, (2) N input/output ports coupled to the monolithic refractive element and configured to inject an optical beam into a first set of planes in the monolithic refractive element at an angle that causes total internal reflection of the optical beam between first and second refractive surfaces of the monolithic refractive element, N being greater than one, (3) M input/output ports coupled to the monolithic refractive element and configured to extract an optical beam travelling in a second set of planes in the monolithic refractive element, M being greater than one, the second set of planes being orthogonal to the first set of planes and (4) a plurality of frustrating elements coupled to the monolithic refractive element and corresponding to the N input/output ports and the M input/output ports and configured to frustrate the total internal reflection selectively to cause the electromagnetic energy to travel from ones of the first set of planes to ones of the second set of planes.

Another aspect provides a method of operating an N×M monolithic switch. In one embodiment, the method includes: (1) injecting electromagnetic energy via a first input/output port into a first plane of a monolithic refractive element of the switch at an angle that causes total internal reflection of the electromagnetic energy between first and second refractive surfaces of the monolithic refractive element, the switch having N input/output ports, N being greater than one, (2) selectively causing a frustrating element to frustrate the total internal reflection and thereby cause the electromagnetic energy to travel from the first plane to a second plane of the monolithic refractive element, the second plane being aparallel to the first plane and (3) extracting the electromagnetic energy travelling in the second plane via a second input/output port, the switch further having M input/output ports, M being greater than one.

BRIEF DESCRIPTION

Reference is now made to the following descriptions taken in conjunction with the accompanying drawings, in which.

DETAILED DESCRIPTION

Disclosed herein are various embodiments of an N×M monolithic switch that substantially reduces the number of input/output ports and switch elements and corresponding drivers. To do so, a single main refractive element, herein called a "monolithic refractive element," is employed to transport optical signals among the N×M input/output ports. In contrast with the conventional 4×4 switch described in the Background above, a 4×4 monolithic switch constructed according to the principles of the invention can be implemented with only eight input/output ports (80% fewer than conventionally required) and 16 switch elements and corresponding drivers (50% fewer than conventionally required), saving both material and labor costs.

Figure 1:
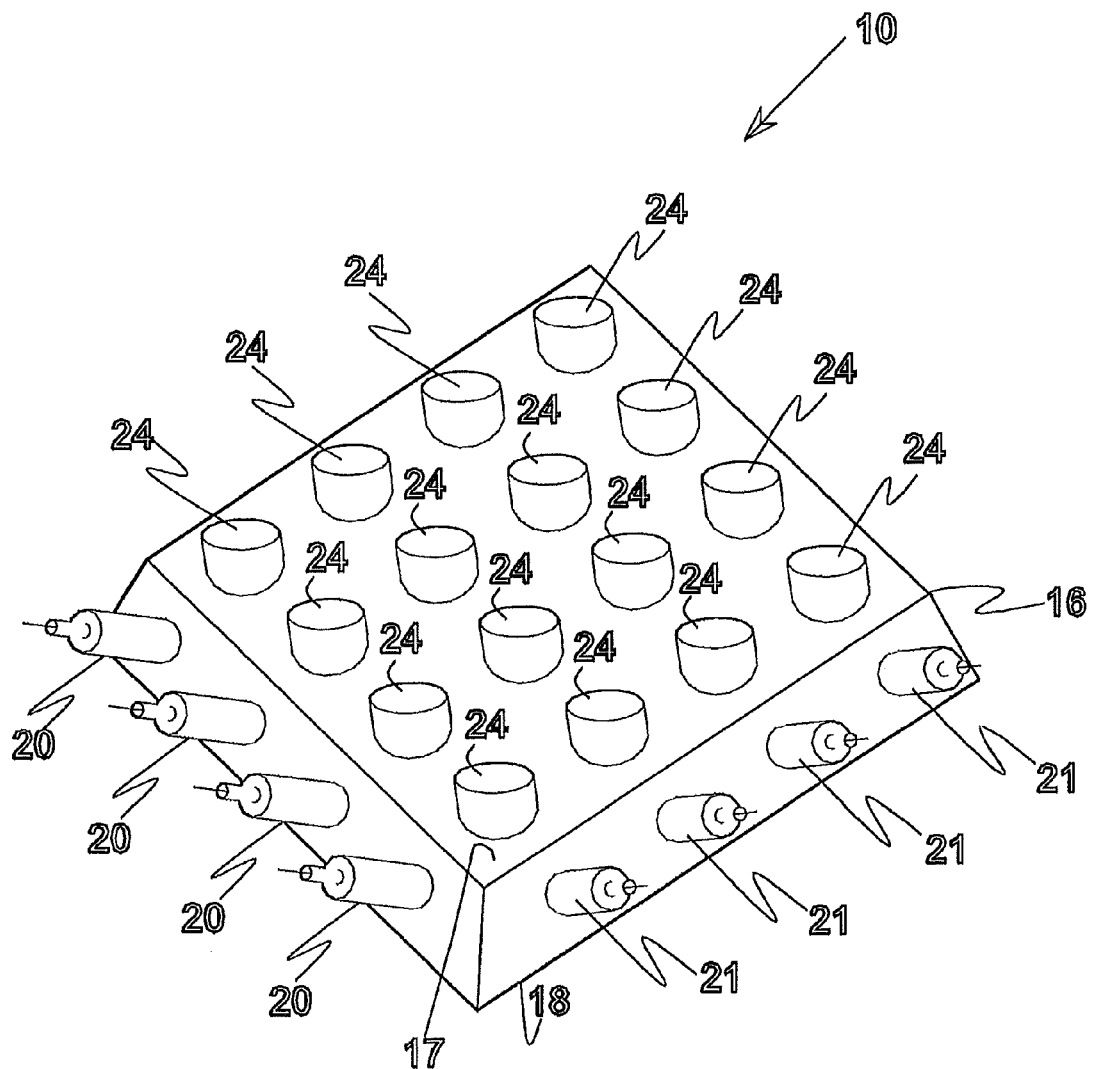
FIG. 1 is an isometric view of one embodiment of an N×M monolithic switch for an optical network.

FIG. 1 is an isometric view of one embodiment of an N×M monolithic switch 10 for an optical network. The illustrated embodiment of the N×M monolithic switch 10 base includes a monolithic refractive element 16 of refractive material having a first refractive surface 17 and an opposing, second refractive surface 18. In the illustrated embodiment, the monolithic refractive element is composed of glass. The monolithic refractive element 16 is configured (beveled, in the illustrated embodiment) to receive an optical signal via any of N input/output ports 20 and direct the optical signal through the monolithic refractive element 16 to any of M input/output ports 21. Those skilled in the pertinent art should understand that, because electromagnetic waves (including light) are reversible, the input/output ports 20 and the input/output ports 21 may serve as either input or output ports, as their name implies.

In various embodiments, the input/output ports 20 and input/output ports 21 include fiber waveguides and respective gradient index-of-refraction (GRIN) lenses (not shown, but to be shown in FIG. 2) that collimate optical beams emanating therefrom. A plurality of frustrating elements 24 are located proximate one or both of first and second surfaces 17, 18 of the monolithic refractive element 16. The plurality of frustrating elements 24 are configured to frustrate total internal reflection (TIR) selectively only when in contact with the monolithic refractive element 16 ("closed") at a reflection node (not shown) thereof, and further configured to allow TIR to continue when not in contact with the monolithic refractive element 16 ("open"). To effect switching, the plurality of frustrating elements 24 are configured to redirect optical beams among planes within the monolithic refractive element 16 when closed. In the illustrated embodiment, the plurality of frustrating elements 24 are located proximate only the first surface 17, and the first and second surfaces 17, 18 are generally parallel with one another.

An optical beam (not shown) enters the monolithic refractive element 16 via any of the input/output ports 20 and impinges on first and second refractive surfaces 17, 18 thereof at an angle that is less than a critical angle such that it is reflected between the first and second refractive surfaces 17, 18 by TIR. The optical beam continues to be reflected between the first and second refractive surfaces 17, 18 until it encounters a closed frustrating element 24 at a reflection node. The closed frustrating element 24 is configured to shift the optical beam from a first plane (not shown, but shown in FIGS. 6 and 7) to a second plane (not shown, but shown in FIGS. 6, 7 and 8). The first plane and the second plane are not coplanar; neither is the first plane or the second plane coplanar with either the first refractive surface 17 or the second refractive surface 18. In the illustrated embodiment, the first plane, the second plane and the first refractive surface 17 are generally orthogonal (oriented at approximately 90° angles) to one another.

In the illustrated embodiment, the frustrating element 24 receives the optical beam in the first plane and reflects the optical beam out of the first plane into the second plane and back into the refractive element 16 where it is again reflected by TIR.

Figure 2:
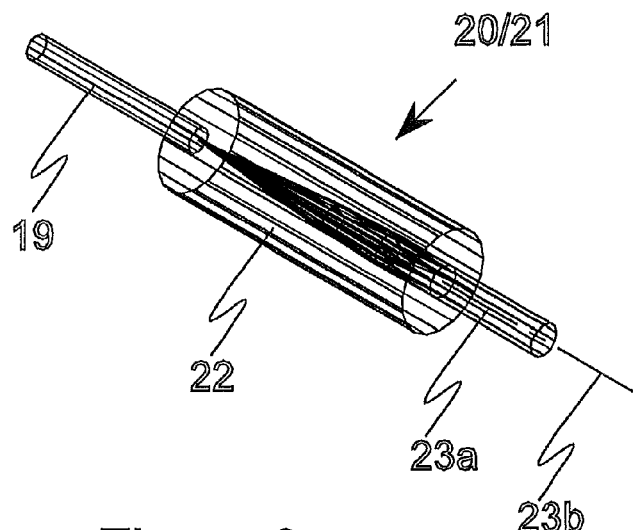
FIG. 2 is an isometric view of one embodiment of an input/output port of the N×M monolithic switch of FIG. 1.

FIG. 2 is an isometric view of one embodiment of an input/output port (e.g., an input/output port 20 or an input/output port 21) of the N×M monolithic switch of FIG. 1. In this embodiment, an optical fiber 19 is aligned and attached to a lens 22, which is a GRIN lens in one particular embodiment. The lens 22 forms a proximate collimated beam 23a from the fiber 19, represented as an the axial ray 23b emanating from the collimated beam 23a. Those skilled in the pertinent art will recognize that many ways exist to generate a generally collimated beam 23a and inject it into a monolithic refractive element of refractive material (e.g., the monolithic refractive element 16 of FIG. 1) or to extract a generally collimated beam from a monolithic refractive element of refractive material and cause it to enter an optical fiber.

Figure 3:
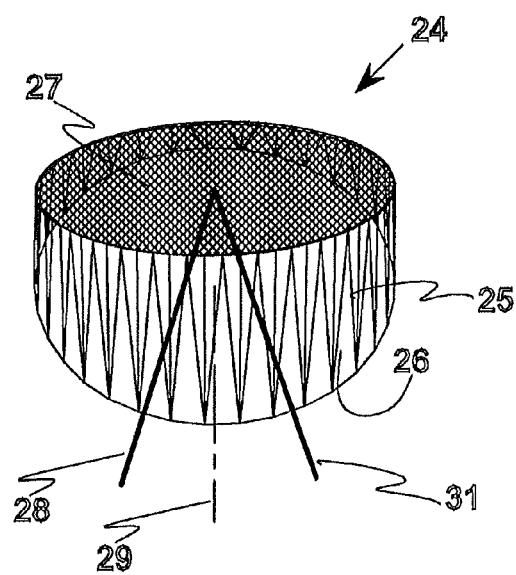
FIG. 3 is an isometric view of one embodiment of a frustrating element of the N×M monolithic switch of FIG. 1.

FIG. 3 is an isometric view of one embodiment of one of the plurality of frustrating elements 24 of the N×M monolithic switch 10 of FIG. 1. The frustrating element 24 includes a body 25 composed of a refractive material and having a generally planar frustrating surface 26 and a generally planar reflecting surface 27. The reflective surface 27 is aparallel (other than parallel) to the frustrating surface 26. In various embodiments, the angle between the reflective surface 27 and the frustrating surface 26 is between about 15° and about 40°. In other embodiments, the angle between the reflective surface 27 and the frustrating surface 26 is between about 25° and about 36°. In the illustrated embodiment, the angle between the reflective surface 27 and the frustrating surface 26 is about 32°.

Those skilled in the pertinent art are familiar with techniques for creating a reflecting surface on a refractive material. In one embodiment, the reflective surface 27 is a dielectric coating. In the illustrated embodiment, the reflective surface 27 is coated with silver. In the illustrated embodiment, the body 25 is generally cylindrical. In alternative embodiments, the body 25 assumes other shapes as may be appropriate for a particular switch.

When the frustrating surface 26 of the frustrating element 24 contacts the refractive surface 17 of the refractive material 16 at a reflection node thereof, a collimated beam travels into the frustrating element 24. In FIG. 3, an incoming beam 28 represents the collimated beam. The incoming beam 28 impinges upon the reflective surface 27 at a compound angle to an axis 29 normal to the frustrating surface 26. In the illustrated embodiment, the compound angle is 45° relative to a first (incoming) plane and about 22.5° relative to the perpendicular to the plane of the first refractive surface 17. The incoming beam 28 is then redirected to form an outgoing beam 31, translating the beam from the first plane to a second (outgoing) plane that is aparallel to the first plane.

Figure 4:
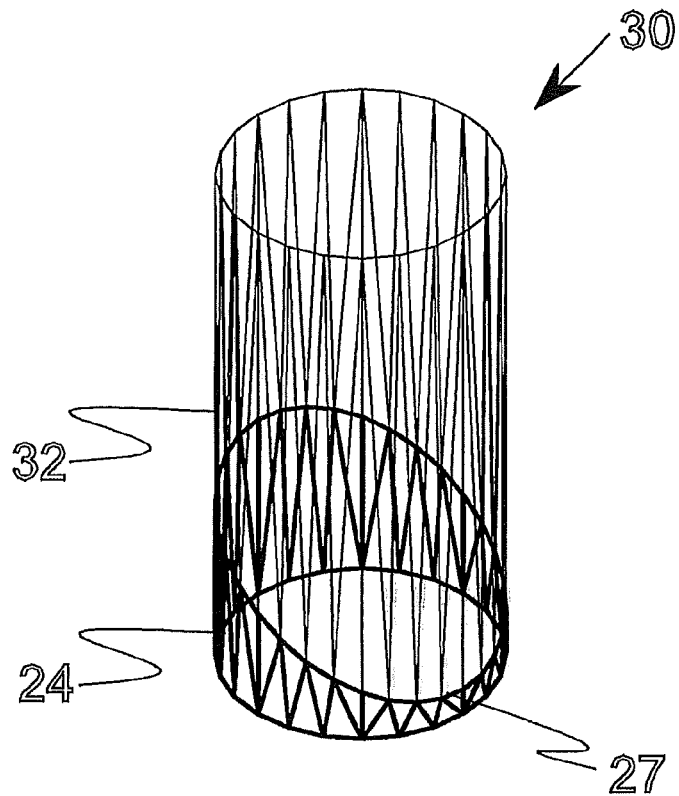
FIG. 4 is an isometric view of one embodiment of a plunger of the N×M monolithic switch of FIG. 1.

FIG. 4 is an isometric view of one embodiment of a plunger. FIG. 4 shows a plunger 30 including the frustrating element 24 and a plunger extension 32. In various embodiments, the plunger extension 32 is solid to increase the chances that any shock wave generated as a result of actuating the plunger 30 are transferred generally uniformly to the frustrating element 24. In the illustrated embodiment, the plunger 30 is generally cylindrical. In alternative embodiments, the plunger 30 assumes other shapes as may be appropriate for a particular switch.

Figure 5:
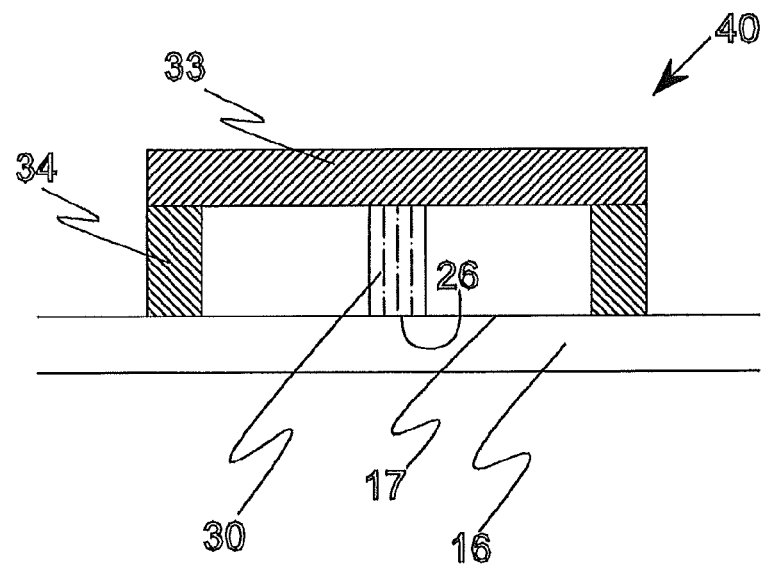
FIG. 5 is an elevational view of one embodiment of an actuator of the N×M monolithic switch of FIG. 1.

FIG. 5 is an elevational view of one embodiment of an actuator 40. The actuator 40 is attached to the monolithic refractive element 16 of the N×M monolithic switch 10. A spacer 34 provides a mount for a transducer 33. In various embodiments, the spacer 34 is dimensioned such that the frustrating surface 26 is spaced greater than one wavelength apart from the first refractive surface 17 of the monolithic refractive element 16 while the frustrating element (24 of FIG. 1) is open. In various embodiments, the transducer 33 is composed of a piezoelectric material and driven by an electrical signal to cause the transducer 33 to move the plunger 30, including the frustrating element 24, relative to the monolithic refractive element 16. The actuator 40 is positioned proximate a reflective node of the monolithic refractive element 16. Upon activation, the transducer 33 forces the frustrating surface 26 to within one wavelength of the first refractive surface 17 of the monolithic refractive element 16, and in the illustrated embodiment, causes the frustrating surface 26 to contact the first refractive surface 17. Other embodiments employ a transducer 33 that is other than piezoelectric (e.g., voicecoil or reed). In still further embodiments, the transducer maintains the frustrating surface 26 within one wavelength or in contact with the refractive surface 17 when inactive such that, upon activation, the frustrating surface 26 is separated from the refractive surface 17. Those skilled in the pertinent art will also understand that recognize that numerous spacer 34 configurations exist by which the transducer 33 may be attached to the monolithic refractive element 16.

Figure 6:
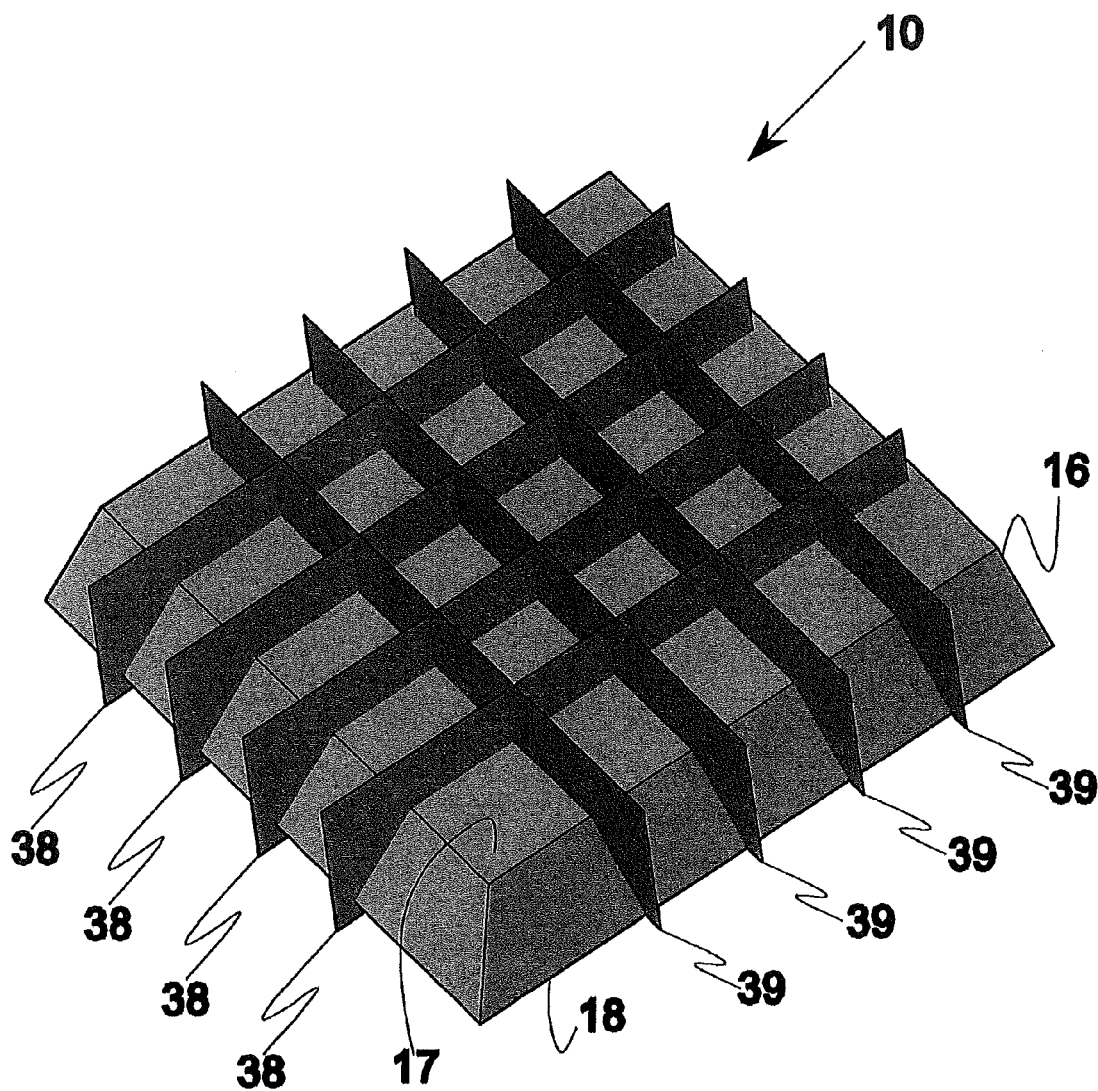
FIG. 6 is an isometric view of one embodiment of planes in the N×M monolithic switch of FIG. 1.

FIG. 6 is an isometric view of one embodiment of planes in the N×M monolithic switch of FIG. 1. A first set of N planes 38 is defined. In the illustrated embodiment, each plane of the first set of N planes 38 is parallel to the other planes thereof and, further, perpendicular to the first and second refractive surfaces 17 and 18 of the monolithic refractive element 16. A second set of M planes 39 is also defined. In the illustrated embodiment, each plane of the second set of M planes 39 is parallel to the other planes thereof and, further, perpendicular to the first and second refractive surfaces 17 and 18 of the monolithic refractive element 16. Still further, the second set of M planes 39 is perpendicular to the first set of N planes 38. In alternative embodiments, at least some of the planes of the first set of N planes 38 or the second set of M planes 39 are aparallel to one another. In yet further embodiments, the first set of N planes 38 or the second set of M planes 39 are not fully perpendicular to each other. In still further embodiments, the first set of N planes 38 or the second set of M planes 39 are not fully perpendicular to the first and second refractive surfaces 17 and 18 of the monolithic refractive element 16. Those skilled in the pertinent art will recognize that N and M can take on any positive integer value and do not have to be equal to each other. In the illustrated embodiment, the plurality of frustrating elements are located at intersections of the first set of N planes 38 and the second set of M planes 39.

Figure 7:
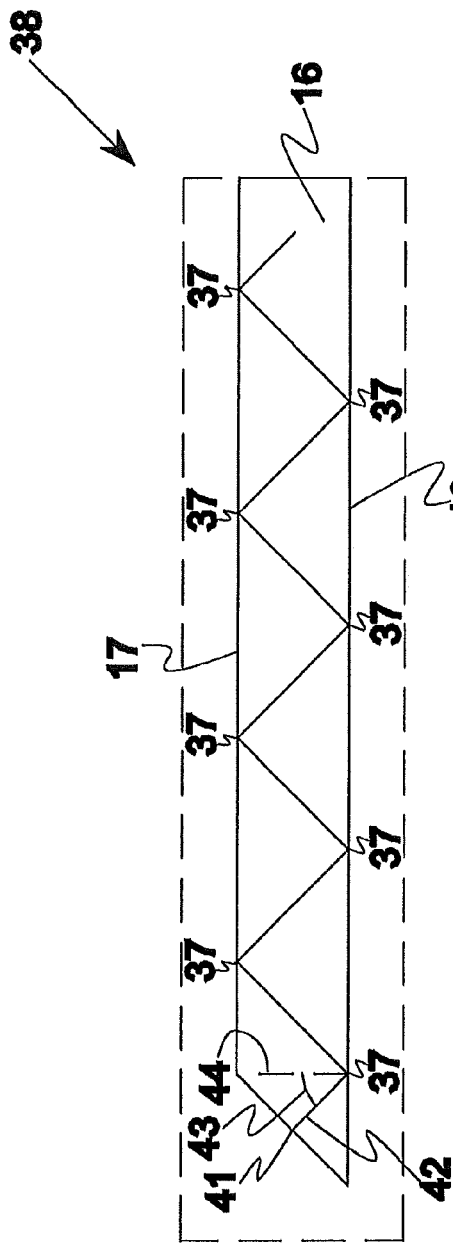
FIG. 7 is an elevational view of one embodiment of beam paths in one of the planes of FIG. 6.

FIG. 7 is an elevational view of one embodiment of beam paths in one of the planes of FIG. 6 (e.g., one of the first set of N planes 38 or the second set of M planes 39 thereof). FIG. 7 shows an input beam 42 that has been injected at an injection point 41 into the monolithic refractive element 16. The input beam 42 is injected such that an angle 43 from the a normal (perpendicular) angle 44 of the first and second refractive surfaces 17 and 18 is greater than the critical angle as defined by Snell's Law. For example, for typical materials with nominal indices of refraction on the order of n≅1.5 and with a refractive material to air interface n=1, Snell's Law indicates a critical angle of 41.8°. In various embodiments the angle 42 is 45°. When the angle of incidence of the input beam 42 is greater than the critical angle, the beam is reflected by TIR, at the first and second refractive surfaces 17, 18 at various the reflection points or nodes 37. The input beam 42 will continue being reflected through the monolithic refractive element 16 in the plane 38 until a surface is encountered for which the incident angle less than or equal to the critical angle.

Figure 8:
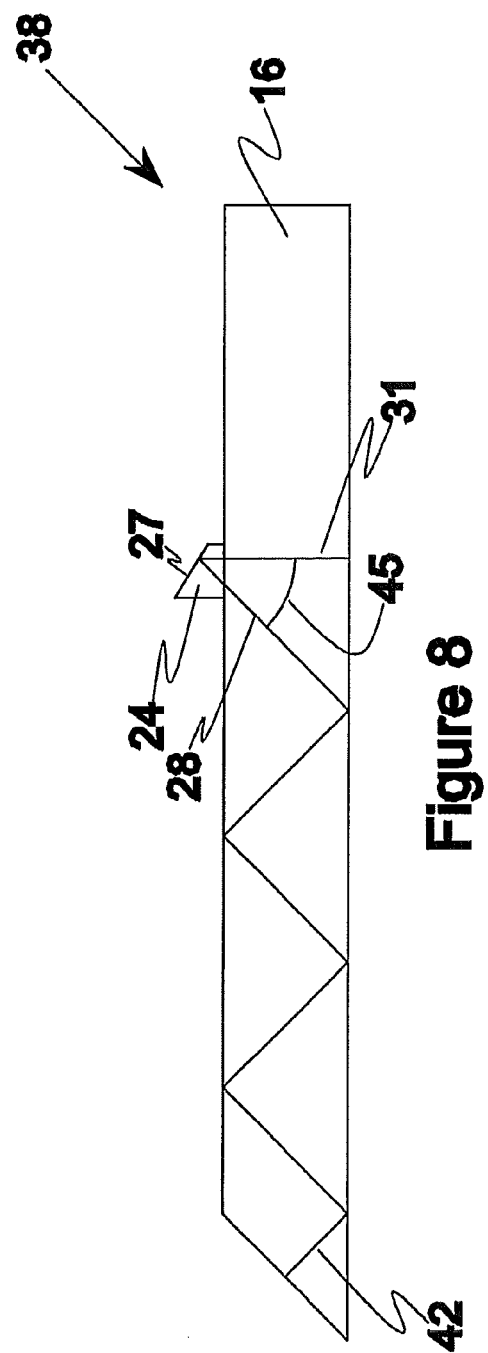
FIG. 8 is an elevational view of one embodiment of a switched beam in the one of the planes of FIG. 7.

FIG. 8 is an elevational view of one embodiment of a switched beam in the one of the planes of FIG. 7. When the input beam 42 encounters a closed (e.g., actuated) frustrating element 24, which has an index of refraction n approximately equaling the index of refraction of the refractive monolithic refractive element, TIR is frustrated, and the input beam 42 exits the monolithic refractive element 16 and enters the frustrating element 24, now referenced in FIG. 8 as an exiting beam 28. The exiting beam 28 is then reflected off the reflective surface 27 of the frustrating element 24 at a compound angle 45 and back into the refractive monolithic refractive element 16, now referenced in FIG. 8 as a reentering beam 31. As stated above, the frustrating element 24 can be applied to either the first refractive surface 17 or the second refractive surface 18.

Figure 9:
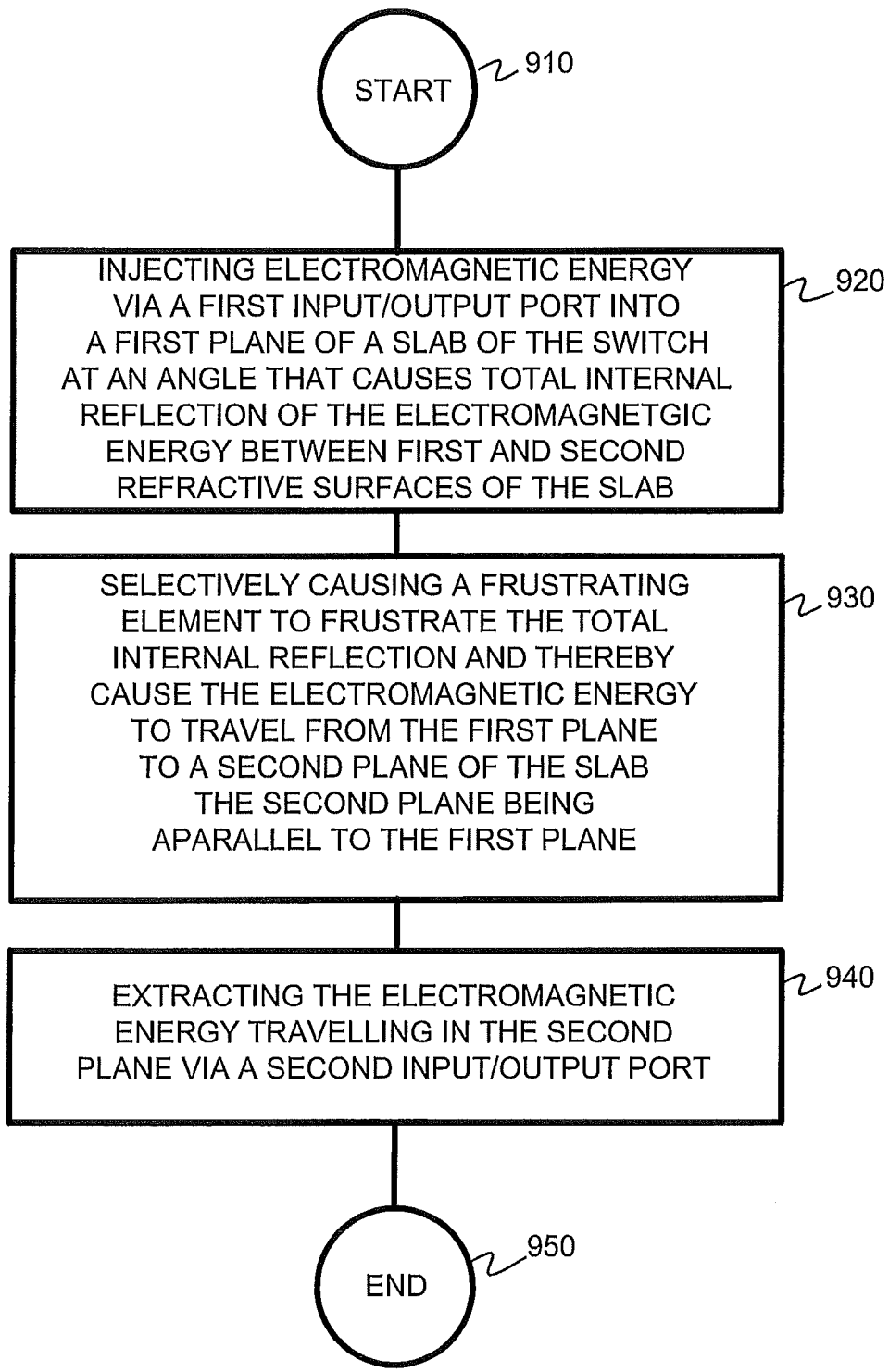
FIG. 9 is a flow diagram of one embodiment of a method of operating an N×M monolithic switch.

FIG. 9 is a flow diagram of one embodiment of a method of operating an N×M monolithic switch. The method begins in a start step 910. In a step 920, electromagnetic energy is injected via a first input/output port into a first plane of a monolithic refractive element of the switch at an angle that causes TIR of the electromagnetic energy between first and second refractive surfaces of the monolithic refractive element. In the illustrated embodiment, the switch has N input/output ports, N being greater than one. In a step 930, a frustrating element is selectively caused to frustrate the TIR and thereby cause the electromagnetic energy to travel from the first plane to a second plane of the monolithic refractive element. In the illustrated embodiment, the second plane is aparallel to the first plane. In a step 940, the electromagnetic energy travelling in the second plane is extracted via a second input/output port. In the illustrated embodiment, the switch further has M input/output ports, M being greater than one. The method ends in an end step 950.

Those skilled in the art to which this application relates will appreciate that other and further additions, deletions, substitutions and modifications may be made to the described embodiments. For example, those skilled in the pertinent art understand that optical beams are but one portion of the electromagnetic spectrum. Accordingly, alternative embodiments of the invention employ the same principles introduced herein to switch electromagnetic waves of other-than-optical frequency, e.g., millimeter or terahertz waves.

What is claimed is:

1. An N×M monolithic switch, comprising:
   a monolithic refractive element;
   N input/output ports coupled to said monolithic refractive element and configured to inject electromagnetic energy into a first set of planes in said monolithic refractive element at an angle that causes total internal reflection of said electromagnetic energy between first and second refractive surfaces of said monolithic refractive element, N being greater than one;
   M input/output ports coupled to said monolithic refractive element and configured to extract electromagnetic energy travelling in a second set of planes in said monolithic refractive element, M being greater than one, said second set of planes being aparallel to said first set of planes; and a plurality of plungers, each of said plurality of plungers including a plunger extension coupled to a frustrating element, each of said plurality plungers coupled to said monolithic refractive element and corresponding to said N input/output ports and said M input/output ports and configured to frustrate said total internal reflection selectively to cause said electromagnetic energy to travel from ones of said first set of planes to ones of said second set of planes, wherein said electromagnetic energy is extracted in said second set of planes from a surface of said monolithic refractive element that is not said first or second refractive surface.

2. The switch as recited in claim 1 wherein said second set of planes is orthogonal to said first set of planes.

3. The switch as recited in claim 1 wherein said first and second refractive surfaces are parallel, opposing surfaces.

4. The switch as recited in claim 1 wherein said first and second set of planes are orthogonal to said first refractive surface.

5. The switch as recited in claim 1 wherein said plurality of plungers is located at intersections of said first and second sets of planes.

6. The switch as recited in claim 1 wherein said frustrating element comprises a frustrating surface and a reflecting surface, said reflecting surface forming a compound angle with respect to one of said first set of planes and one of said second set of planes.

7. The switch as recited in claim 1 wherein said electromagnetic energy is embodied in at least one optical beam.

8. A method of operating an N ×M monolithic switch, comprising:

injecting electromagnetic energy via a first input/output port into a first plane of a monolithic refractive element of said switch at an angle that causes total internal reflection of said electromagnetic energy between first and second refractive surfaces of said monolithic refractive element, said switch having N input/output ports, N being greater than one;

selectively causing a frustrating element of a plunger, said plunger including a plunger extension coupled to said frustrating element, to frustrate said total internal reflection and thereby cause said electromagnetic energy to travel from said first plane to a second plane of said monolithic refractive element, said second plane being aparallel to said first plane; and extracting said electromagnetic energy travelling in said second plane via a second input/output port, said switch further having M input/output ports, M being greater than one, wherein said electromagnetic energy is extracted in said second set of planes from a surface of said monolithic refractive element that is not said first or second refractive surface.

9. The method as recited in claim 8 wherein said second set of planes is orthogonal to said first set of planes.

10. The method as recited in claim 8 wherein said first and second refractive surfaces are parallel, opposing surfaces.

11. The method as recited in claim 8 wherein said first and second set of planes are orthogonal to said first refractive surface.

12. The method as recited in claim 8 wherein said frustrating element is located at intersections of first and second sets of planes thereof.

13. The method as recited in claim 12 wherein said frustrating element comprises a frustrating surface and a reflecting surface, said reflecting surface forming a compound angle with respect to one of said first set of planes and one of said second set of planes.

14. The method as recited in claim 8 wherein said electromagnetic energy is embodied in at least one optical beam.

15. An N×M monolithic switch, comprising:

a monolithic refractive element;

N input/output ports coupled to said monolithic refractive element and configured to inject an optical beam into a first set of planes in said monolithic refractive element at an angle that causes total internal reflection of said optical beam between first and second refractive surfaces of said monolithic refractive element, N being greater than one;

M input/output ports coupled to said monolithic refractive element and configured to extract an optical beam travelling in a second set of planes in said monolithic refractive element, M being greater than one, said second set of planes being orthogonal to said first set of planes; and a plurality of plungers, each of said plurality of plungers including a plunger extension coupled to a frustrating element, each of said plurality of plungers coupled to said monolithic refractive element and corresponding to said N input/output ports and said M input/output ports and configured to frustrate said total internal reflection selectively to cause said optical beam to travel from ones of said first set of planes to ones of said second set of planes, wherein said optical beam is extracted in said second set of planes from a surface of said monolithic refractive element that is not said first or second refractive surface.

16. The switch as recited in claim 15 wherein said first and second refractive surfaces are parallel, opposing surfaces.

17. The switch as recited in claim 15 wherein said first and second set of planes are orthogonal to said first refractive surface.

18. The switch as recited in claim 15 wherein said plurality of plungers is located at intersections of said first and second sets of planes.

19. The switch as recited in claim 15 wherein said frustrating element comprises a frustrating surface and a reflecting surface, said reflecting surface forming a compound angle with respect to one of said first set of planes and one of said second set of planes.

20. The switch as recited in claim 15 wherein each of said plurality of plungers is associated with an actuator having a spacer and a transducer coupled thereto.

* * * * *